United States Patent
Padgett

[15] 3,705,502
[45] Dec. 12, 1972

[54] LIQUID COOLED SEAL LUBE COUPLING
[72] Inventor: George L. Padgett, Greenville, S.C.
[73] Assignee: General Electric Company
[22] Filed: Feb. 26, 1971
[21] Appl. No.: 119,142

[52] U.S. Cl..............................64/32 R, 192/113 B
[51] Int. Cl................................................F16d 3/84
[58] Field of Search..........64/30 LB, 32; 192/113 B; 184/104 R

[56] References Cited

UNITED STATES PATENTS

| | | | |
|---|---|---|---|
| 2,372,289 | 3/1945 | O'Malley | 64/32 R |
| 2,414,814 | 1/1947 | Johnson | 184/104 R |
| 1,739,779 | 12/1929 | Blood | 184/104 R |
| 2,844,947 | 7/1958 | Shipley | 64/30 LB |
| 3,592,298 | 7/1971 | Leffert et al. | 192/113 B |

Primary Examiner—Edward G. Favors
Attorney—William C. Crutcher, James W. Mithell, Frank L. Neuhauser, Oscar B. Waddell and Joseph B. Forman

[57] ABSTRACT

A liquid cooled, sealed lubrication gear type coupling for connecting a pair of rotating machine shafts. A sealed liquid lubricant reservoir is provided between inner and outer coupling members so as to lubricate interlocked gear teeth, while fluid coolant is distributed over the outer member to dissipate heat transferred from the inner member to the outer member.

7 Claims, 3 Drawing Figures

PATENTED DEC 12 1972          3,705,502

INVENTOR:
GEORGE L. PADGETT,
BY *James W. Mitchell*
HIS ATTORNEY.

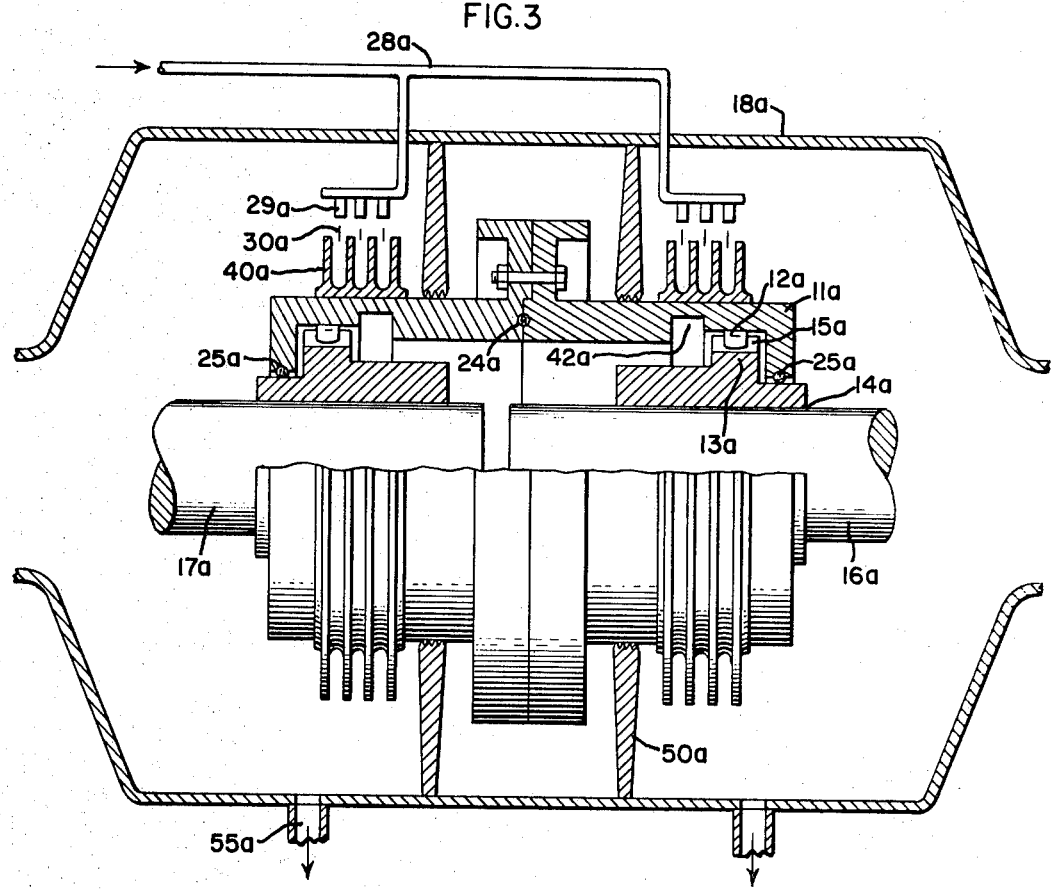

LIQUID COOLED SEAL LUBE COUPLING

BACKGROUND OF THE INVENTION

The present invention is directed in general to the cooling and lubrication of flexible couplings and in particular to the cooling of a gear type flexible coupling.

A "gear type" coupling is one generally which has a cylindrical spacer, each end of which is formed with external gear teeth on the circumference of the spacer. A hub with an axial bore having internal gear teeth within the axial bore which interlock with the spacer gear teeth is mounted on each end of the spacer. A rotatable machine shaft is attached at each hub and hence coupled by means of the spacer and the hub. An alternate form of gear type coupling has the gear teeth reversed so that there are internal teeth on the spacer and external teeth on the hubs.

While the gear teeth do not rotate relative to one another, they are subject to friction generated heat because of relative thrust and misalignment movement of the two shafts. This buildup of heat causes added wear and may result in shorter coupling life, particularly in a heated environment such as a gas turbine exhaust plenum.

Two methods for cooling "gear type" flexible couplings are generally known. The first method of cooling comprises the use of a sealed reservoir about the gear teeth of the flexible couplings. Heat is collected in the reservoir and then distributed by conduction to an external hub to be dissipated by convection to the air surrounding the couplings. This method of cooling is disadvantageous to the extent that it requires that the air surrounding the coupling to be cool enough to permit the dissipation of heat.

The second method for cooling "gear type" flexible couplings is the continuously lubricated type in which lubricating liquid is injected into a coupling where it then flows through the gear teeth and escapes through holes to be drained back to a supply tank. Problems inherent in this type of arrangement include leakage from labyrinth seals positioned around the spacer which may not be tightly fitted because of the flexibility required within the coupling and also lubrication contamination of the gear teeth since often the lubricant is taken from a centralized lubrication system. Presently, such a system would require a filter to prevent fouling of the gear teeth.

OBJECTS OF THE INVENTION

It is an object of this invention to provide a lubrication system for a gear type flexible coupling which provides for improved lubrication of the gear type flexible coupling.

It is an object of this invention to provide a lubrication system for a gear type flexible coupling which provides for cooling the hub portion surrounding the gear teeth.

It is an object of this invention to provide a lubrication system for a gear type flexible coupling in which there is no lubricant contamination of the gear teeth.

It is an object of this invention to provide a lubrication system for a gear type flexible coupling in which leakage from the seals is minimized.

Other objects, advantages and features of the present invention will become apparent from the following detailed description of an embodiment thereof taken in connection with the accompanying drawings.

DRAWINGS

FIG. 3 is a view similar to FIG. 1 showing an alternate embodiment of the flexible coupling with the present invention applied thereto.

BRIEF SUMMARY OF THE INVENTION

In a "gear type" flexible coupling, cooling is provided by a sealed lubrication reservoir in combination with a continuous flow of fluid coolant about the exterior of the coupling near the reservoir.

DETAILED DESCRIPTION OF THE INVENTION

Figure 1:
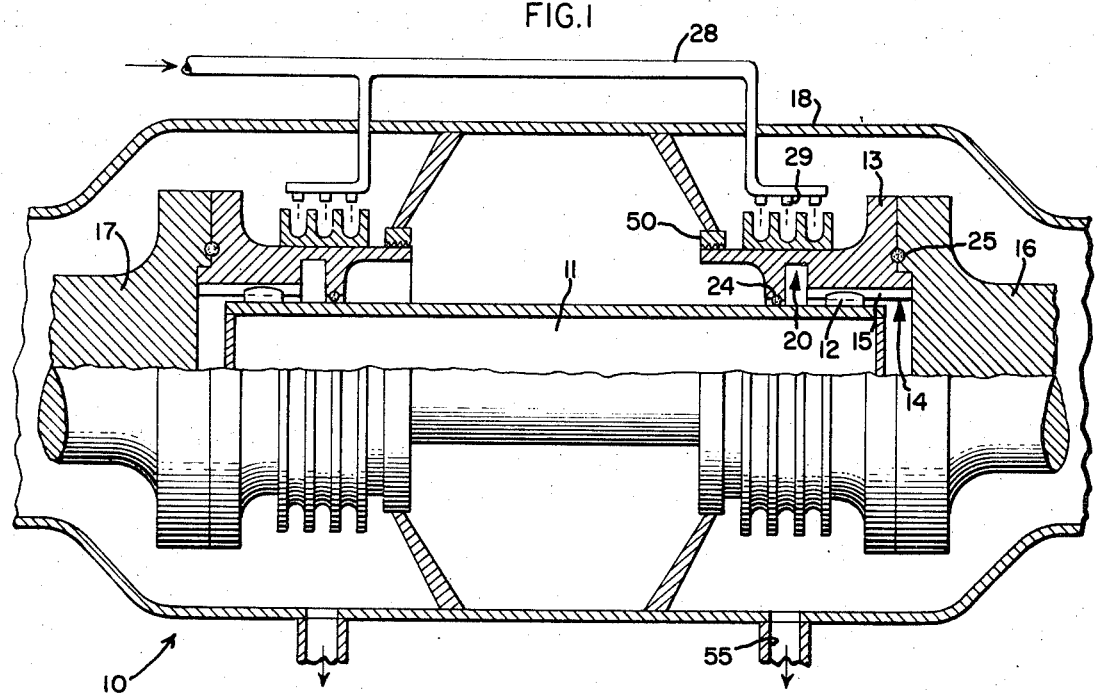
FIG. 1 is a partially sectioned elevational view of a flexible gear coupling with the present invention applied thereto.
Figure 2:
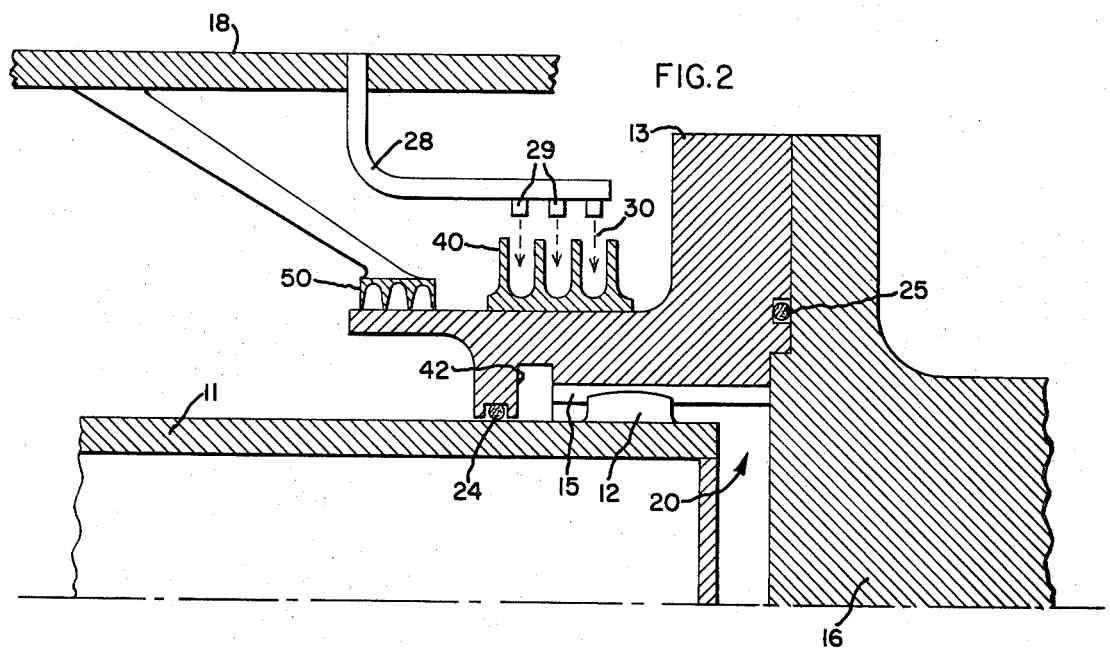
FIG. 2 is an enlarged detail of FIG. 1 showing a sectional elevation view of the lubrication system as applied to the flexible coupling.

Referring now to FIGS. 1 and 2, a gear type flexible coupling generally indicated at 10 is comprised of inner and outer coupled members including a spacer 11 having a plurality of gear teeth 12 formed at each end of the spacer. At each end of the spacer, there is an annular hub 13 having an axial bore 14 within which are formed a plurality of gear teeth 15. The gear teeth of the hub interlock with the gear teeth formed on the spacer. A cylindrical housing 18 may enclose the coupling from hub to hub. At each end of the coupling is a pair of rotatable machine shafts 16 and 17 for which the coupling is provided, which is attached to the hub at each end of the coupling.

A sealed lubrication means comprises a reservoir 20 which flows around the gear teeth and is sealed by a pair of O-rings 24 and 25. This sealed lubrication means is within the hub surrounding the gear teeth of the spacer. The O-rings prevent leakage of the lubricant about the spacer and also prevents contamination of the lubricant around the gear teeth.

A supply duct 28 having a plurality of outlets 29 impinges a fluid coolant 30 over the hub 13 of the coupling for cooling the hub which has been heated by conduction through the hub from the sealed lubricant reservoir. The coolant may be from any suitable source such as an auxiliary water supply or may comprise the bearing lubrication oil normally used with rotating equipment. A plurality of U-shaped finned surfaces 40 may be provided on the periphery of the hub to increase the cooling effect. The hub 13 may also be provided with an annular recess 42 which serves to hold the coupling lubricant and increase conduction through the hub metal to fins 40.

A labyrinth seal 50 is supported from the surrounding housing 18 and is tightly fitted about the hub since the requirement of flexibility applies primarily to the spacer rather than the hub. A drain passage 55 allows the fluid coolant 30 to be transferred from the vicinity immediately surrounding the hub to a reservoir (not shown) outwardly of the housing whereupon it may be cooled and then recirculated.

The liquid cooled sealed lubrication coupling operates as follows. Heat accumulated in the spacer 11 and the gear teeth 12 and 15, caused by friction due to relatively moving parts, is transferred by conduction to the sealed lubrication reservoir 20. This causes a conductive heat transfer from the sealed lubrication reservoir through the surrounding hub 13. The surrounding hub is then cooled by the continuously flowing fluid coolant 30 aided by radial fins 40.

In the alternate embodiment as shown in FIG. 3, two rotatable machine shafts 16a and 17a are flexibly coupled by cylindrical inner and outer coupled members including a pair of annular hubs 13a having an axial bore 14a through which the rotatable shafts are mounted. Also included with the cylindrical coupled members is a hollow cylindrical spacer 11a. The hub has a plurality of gear teeth 15a circumferentially arranged on its outer surface. The spacer also has a plurality of gear teeth 12a arranged circumferentially on its exterior surface at both ends of the spacer. A hub is placed at each end of the spacer so that the respective gear teeth interlock.

The sealed lubrication means is contained by O-ring seals 24a and 25a while lubricant is free to flow around the gear teeth within the interior of the spacer. A recess 42a is provided within the interior of the spacer at both ends of the spacer to admit coupling lubricant so as to increase conduction through the metal of the spacer away from the gear teeth.

The coupling members may be encased in a cylindrical housing 18a. A supply duct 28a from an exterior source (not shown) distributes liquid coolant 30a to the exterior portion of the coupling through a plurality of outlets 29a. The liquid coolant then flows over a plurality of U-shaped fins 40a arranged circumferentially about the exterior circumference of the spacer. These U-shaped fins enhance the cooling effect upon the spacer. Annular labyrinth seals 50a are supported by the cylindrical housing and drain holes 55a are provided in the exterior circumference of the cylindrical housing.

While there is shown what is considered to be the preferred embodiment of the invention, it is of course understood that various other modifications may be made therein, and it is intended to cover in the appended claims all such modifications as fall within the true spirit and scope of the invention.

What is claimed is:

1. In a gear type flexible coupling for connecting a pair of rotating machine shafts, said coupling having cylindrical inner and outer coupled members including a spacer with a plurality of gear teeth at each end, and a hub, one at each end of the spacer, with a plurality of gear teeth interlocked with said spacer gear teeth; a liquid cooled sealed lubrication system comprising:

an annular sealed liquid reservoir defined by the outer one of said coupled members, said interlocked gear teeth being disposed therein, and means providing a flow of liquid coolant about the outer surface of said outer coupled member near said reservoir.

2. The liquid cooled sealed lubrication system as recited in claim 1 wherein a plurality of U-shaped cooling fins are circumferentially mounted about the outer one of said coupled members.

3. The liquid cooled sealed lubrication system as recited in claim 1 wherein an annular recess is provided within the interior of the outer coupled member forming part of the sealed liquid reservoir and aiding in the conductive heat transfer from the sealed liquid reservoir through the outer member.

4. The liquid cooled sealed lubrication system as recited in claim 1 wherein the liquid coolant comprises bearing lubricant for said rotating shafts.

5. The liquid cooled sealed lubrication system as recited in claim 1 wherein the outer one of said coupled members is the hub at each end of the spacer and the inner one of said coupled members is the spacer.

6. The liquid cooled sealed lubrication system as recited in claim 1 wherein the outer one of said coupled members is the spacer and the inner one of said coupled members is the hub at each end of the spacer.

7. In a gear type flexible coupling for connecting a pair of rotating machine shafts, said coupling having cylindrical coupled members including a spacer with a plurality of gear teeth formed thereon at each end of the spacer, a hub having an axial bore and gear teeth formed therein mounted at each end of the spacer so that the respective gear teeth interlock with one another, a liquid cooled sealed lubrication system including:

an annular sealed liquid reservoir surrounding the gear teeth at each end of the spacer, said reservoir formed between the hub and the spacer;

an annular recess provided within the interior of the hub forming part of the sealed liquid reservoir;

a plurality of U-shaped cooling fins mounted circumferentially about the exterior of the hub, and a supply duct for impinging a continuous flow of liquid coolant upon the cooling fins whereby heat generated in the gear teeth is transferred by conduction to the sealed reservoir; from the reservoir to the hub where it is dissipated by the continuous flow of liquid coolant over the cooling fins.

* * * * *